United States Patent
Cha et al.

(10) Patent No.: US 8,030,991 B2
(45) Date of Patent: Oct. 4, 2011

(54) FREQUENCY TUNING AND DIRECT CURRENT OFFSET CANCELING CIRCUIT FOR CONTINUOUS-TIME ANALOG FILTER WITH TIME DIVIDED

(75) Inventors: Sang Hyun Cha, Yongin-si (KR); Chang Seok Lee, Seoul (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 50 days.

(21) Appl. No.: 12/614,244

(22) Filed: Nov. 6, 2009

(65) Prior Publication Data
US 2011/0051850 A1    Mar. 3, 2011

(30) Foreign Application Priority Data
Aug. 31, 2009  (KR) .................. 10-2009-0081541

(51) Int. Cl.
*H04B 1/10* (2006.01)
*H04B 1/12* (2006.01)
(52) U.S. Cl. ...................... 327/553; 455/307
(58) Field of Classification Search .......... 327/552–559; 455/296, 307
See application file for complete search history.

(56) References Cited

U.S. PATENT DOCUMENTS
2004/0169565 A1* 9/2004 Gaggl et al. ............... 333/17.1

FOREIGN PATENT DOCUMENTS
KR   10-2000-0038107 A   7/2000
KR   1020060119242       11/2006

OTHER PUBLICATIONS
Korean Office Action for Application No. KR 10-2009-0081541 mailed Dec. 20, 2010.

* cited by examiner

*Primary Examiner* — David Mis
(74) *Attorney, Agent, or Firm* — Lowe, Hauptman, Ham & Berner, LLP

(57) ABSTRACT

The present invention provides a frequency tuning/DC offset canceling circuit for continuous-time analog filter with time division, the frequency tuning/DC offset canceling circuit including: a frequency tuning/DC offset canceling unit for performing frequency tuning by comparing an output voltage with a reference voltage when a frequency tuning control signal is inputted, and canceling a DC offset after terminating the frequency tuning when a DC offset canceling control signal is inputted; and a control signal generator for generating the frequency tuning control signal and the DC offset canceling control signal based on a reference clock in time division.

14 Claims, 3 Drawing Sheets

[FIG. 1]
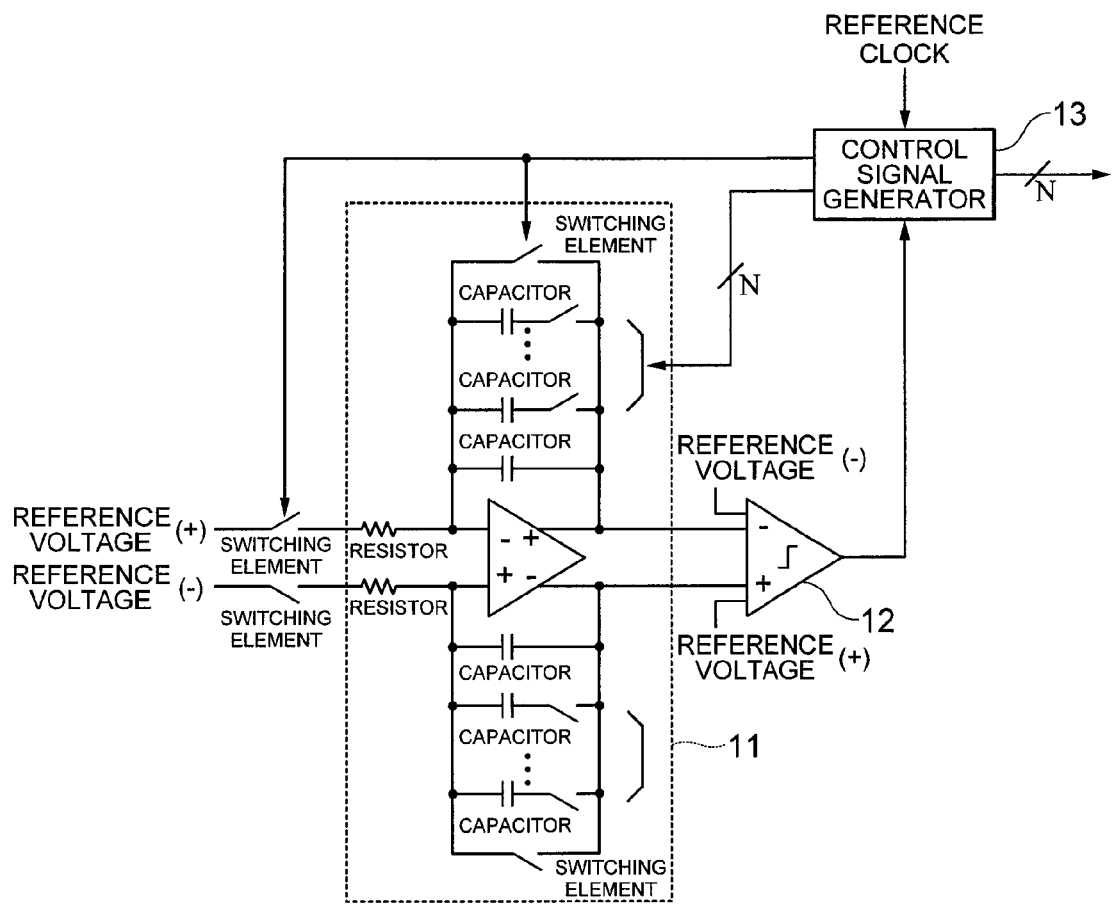
- PRIOR ART -

[FIG. 2]
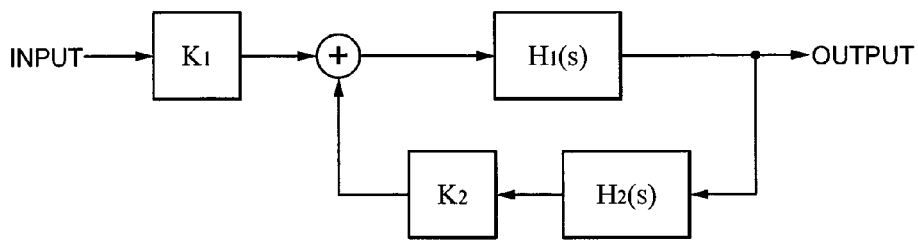
[FIG. 3]
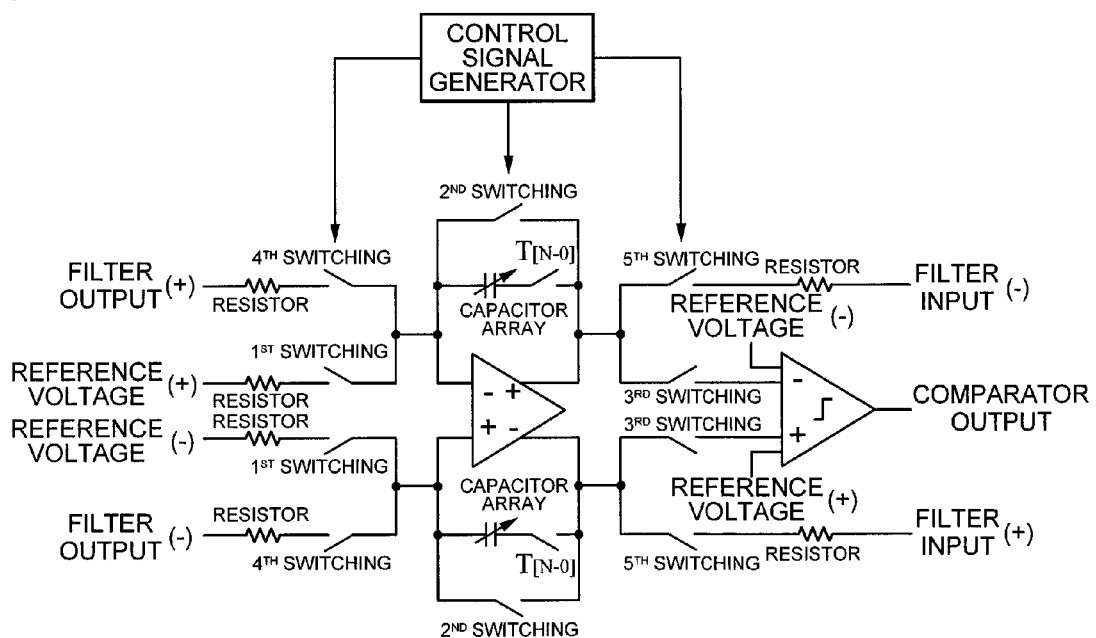

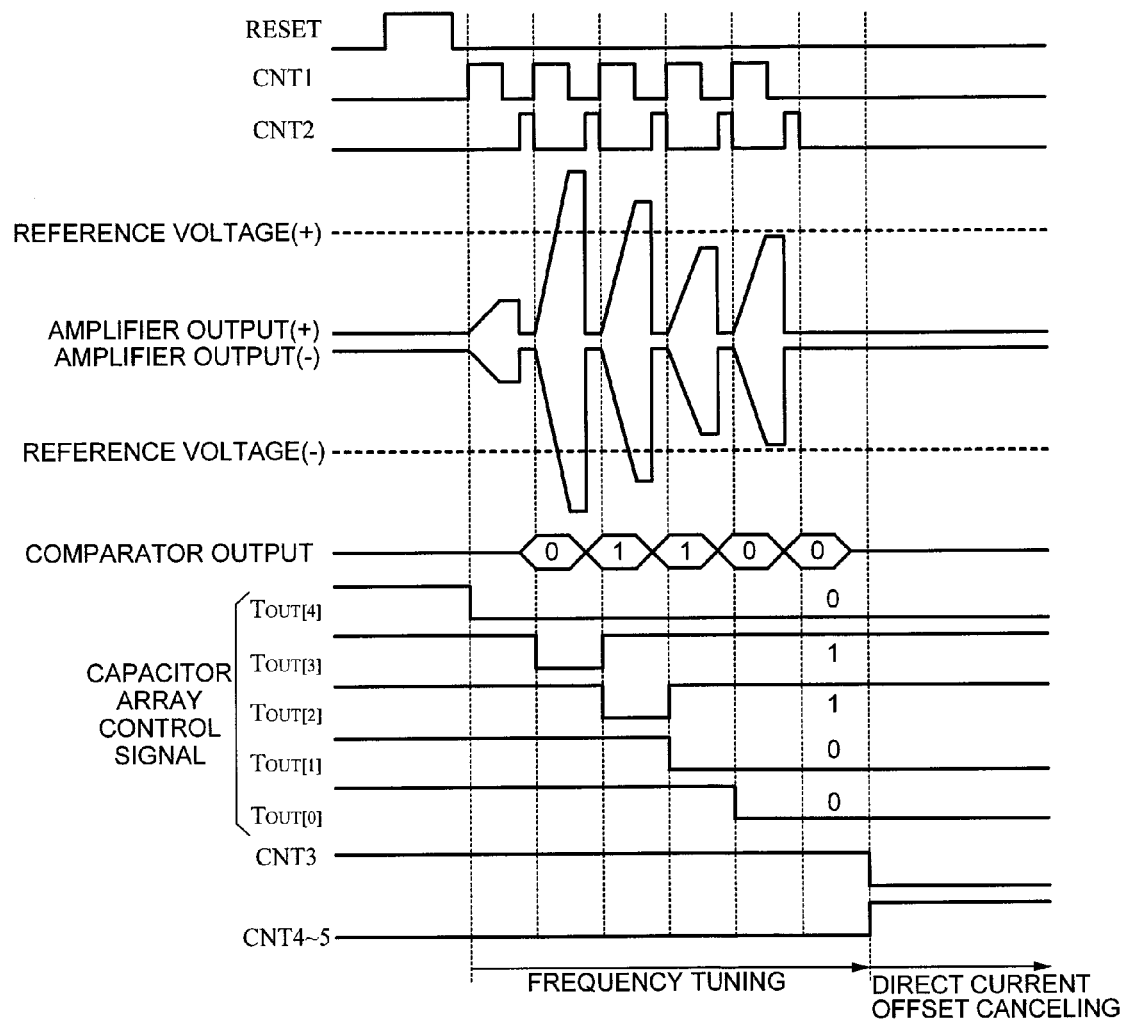
[FIG. 4]

FREQUENCY TUNING AND DIRECT CURRENT OFFSET CANCELING CIRCUIT FOR CONTINUOUS-TIME ANALOG FILTER WITH TIME DIVIDED

CROSS-REFERENCE TO RELATED APPLICATIONS

This application claims the benefit of Korean Patent Application No. 10-2009-0081541 filed with the Korea Intellectual Property Office on Aug. 31, 2009, the disclosure of which is incorporated herein by reference

BACKGROUND OF THE INVENTION

1. Field of the Invention

The present invention relates to a frequency tuning/direct current(DC) offset canceling circuit for continuous-time analog filter with time division, which can tune a cut-off frequency and cancel a DC offset component of a radio frequency(RF) system.

2. Description of the Related Art

In general, the most typical structure for implementing an Radio Frequency system includes a super-heterodyne receiver structure and a direct-conversion receiver structure.

The super-heterodyne receiver is a receiver which performs a signal processing on a baseband by converting an RF signal into an IF frequency and re-converting the resultant frequency into a baseband. The direct-conversion receiver performs a signal processing on a baseband directly without going through an IF frequency.

The direct-conversion receiver has effects of cost reduction, power consumption reduction, entire area reduction due to less uses of analog circuits, whereas it has problems of DC offset, flicker noise, I/O mismatch, and so on.

In particular, noises or offset components of a DC domain are required to be removed because the components cause severe distortion on signals.

Aside from this, when an analog filter in an RF system uses a continuous-time analog filter like an active-RC filter, its cut-off frequency is varied depending on changes of processes, voltages, temperatures, and so on.

FIG. 1 is a circuit diagram showing an integrator-type frequency tuning circuit of differential signaling in a conventional continuous-time analog filter, and FIG. 2 is a circuit diagram of a DC offset canceling circuit of the conventional continuous-time analog filter.

As shown in FIG. 1, an integrator-type frequency tuning circuit of the conventional continuous-time analog filter includes a tuning integrator 11, a comparator 12, and a control signal generator 13.

The tuning integrator 11 includes an operational amplifier used in filters, and frequency characteristics are determined by fixed resistors and variable capacitors. In this case, the variable capacitors include switches controlled by a control signal, and N-bit capacitor array connected to the switches. An integral operation time of the tuning integrator 11 is controlled by a reference clock applied from an outside.

The comparator 12 differentially compares a reference voltage with an output voltage of the integrator per operation period and transfers the resultant voltage to the control signal generator 13.

In this case, when an output voltage difference of the tuning integrator 11 is higher than a reference voltage difference, an output of the comparator 12 becomes "1". Contrary to this, when an output voltage difference of the tuning integrator 11 is lower than a reference voltage difference, an output of the comparator 12 becomes "0."

The connection of the capacitor array is controlled by the control signal of the control signal generator 13, thereby determining a size of the variable capacitor.

The frequency tuning circuit may correspond to just one embodiment of the present invention. An active-RC filter may be implemented by using an active-RC type integrator, and a Gm-C filter may be implemented by using a Gm-G type integrator.

A method for acquiring a time constant (RC or gm/C) most closely approximate to the reference voltage within a predetermined period may use a monolithic scheme or a Successive Approximation Register (SAR) scheme.

As shown in FIG. 2, a conventional DC offset canceling circuit of a continuous-time analog filter may use a method for generating a high-pass pole through feedback connection of a signal direction of a primary integrator.

A transfer function of the DC offset canceling circuit of the conventional continuous-time analog filter for generating a high-pass pole through the feedback connection of the signal direction of the primary integrator is defined by equation (1) below.

$$H(s) = \frac{V_{out}}{V_{IN}} = K_1 \frac{H_1(s)}{1 + K_2 H_1(s) H_2(s)} \quad (1)$$

Herein, $H_1$ denotes a transfer function of a filter, $K_1$, and $K_2$ denote gains of a filter and a feedback path, and $H_2(s)$ denotes a transfer function of the feedback path.

In general, the gain of the filter may be represented by "1" in a DC domain, and since it is assumed that the transfer function of the feedback path shows a low-pass characteristic and the gain of the feedback path is "1", a transfer function in the DC domain may be defined by equation (2) below.

$$H(0) = \frac{1}{1 + H_2(0)} = \frac{1}{1 - \frac{\overline{\omega}_p}{s}} = \frac{s}{s - \overline{\omega}_p} \quad (2)$$

Therefore, a high-pass cut-off frequency in a DC domain becomes $\overline{\omega}_p$ of being a low-pass pole of $H_2(s)$.

As described above, the continuous-time analog filter used in an RF system is required to be provided with a frequency tuning circuit in order to compensate for frequency change. Aside from this, an RF system is required to be provided with a DC offset canceling circuit in order to cancel noises or offsets of a DC domain.

SUMMARY OF THE INVENTION

The present invention has been proposed in order to overcome the above-described problems and it is, therefore, an object of the present invention to provide a frequency tuning and DC offset canceling circuit for continuous-time analog filter with time division, which sensing element characteristics varied depending on processes and environments through one component, thereby simultaneously performing a frequency tuning function for tuning a cut-off frequency, as well as a DC canceling function for canceling a DC offset component in an RF system.

In accordance with one aspect of the present invention to achieve the object, there is provided a frequency tuning/DC offset canceling circuit for continuous-time analog filter with time division, the frequency tuning/DC offset canceling circuit including: a frequency tuning/DC offset canceling unit for performing frequency tuning by comparing an output voltage with a reference voltage when a frequency tuning control signal is inputted, and canceling a DC offset after terminating the frequency tuning when a DC offset canceling control signal is inputted; and a control signal generator for generating the frequency tuning control signal and the DC offset canceling control signal based on a reference clock in time division.

Also, it is preferable that the frequency tuning uses a monolithic scheme or a Successive Approximation Register (SAR) scheme.

Also, it is preferable that the frequency tuning/DC offset canceling unit includes a plurality of switching elements, fixed resistors, variable capacitors, an amplifier, and a comparator.

Also, it is preferable that the frequency tuning/DC offset canceling unit includes a plurality of switching elements, variable resistors, fixed capacitors, an amplifier, and a comparator.

Also, it is preferable that the plurality of switching elements include five switching elements, wherein the first to third switching elements are driven when the frequency tuning control signal is inputted, and the fourth and fifth switching elements are driven when the DC offset canceling control signal is inputted.

Also, it is preferable that when the frequency tuning control signal is inputted, the first switching element applies an input voltage (reference voltage) to the amplifier, the second switching element allows the capacitors to be discharged, and the third switching element connects an output terminal of the amplifier to the comparator.

Also, it is preferable that the third switching element and the fourth and fifth switching elements are driven to be complementary to one another.

Also, it is preferable that when the fourth and fifth switching elements are connected to each other, input and output terminals of the amplifier are connected to output and input terminals of an analog filter in such a manner to be feedback-configured.

Also, it is preferable that during the frequency tuning, a time constant is determined either by a product of values of the resistor and the variable capacitor, or by a product of values of the variable resistor and the capacitor.

Also, it is preferable that when the frequency tuning is performed in the monolithic scheme, the control signal generator compares the output voltage of the amplifier with the reference voltage, and when the comparison result shows the output voltage is within a range set based on the reference voltage, terminates a generation of the frequency tuning control signal and generates a DC offset canceling control signal.

Also, it is preferable that when the frequency tuning is performed in the SAR scheme, the control signal generator connects half capacitor array, repeatedly performs an operation of storing a result, obtained by comparing the output voltage of the amplifier with the reference voltage, in an output register as many as corresponding bits, and then terminates the generation of the frequency tuning control signal and generates a DC offset canceling control signal.

Also, it is preferable that the frequency tuning/DC offset canceling unit includes a plurality of switching elements, variable capacitors, a transconductance amplifier, and a comparator.

Also, it is preferable that during the frequency tuning, the time constant is determined by a ratio of an amplification rate of the transconductance amplifier and the variable capacitor's value.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a circuit diagram showing an integrator-type frequency tuning circuit of the conventional continuous-time analog filter;

FIG. 2 is a circuit diagram showing a DC offset canceling circuit of the conventional continuous-time analog filter;

FIG. 3 is a circuit diagram showing a frequency tuning and DC offset canceling circuit for continuous-time analog filter with time division in accordance with an embodiment of the present invention; and FIG. 4 is waveforms of a control signal and an output signal when frequency tuning is performed in the frequency tuning and DC offset canceling circuit for continuous-time analog filter through an SAR (Successive Approximation Register) scheme.

DETAILED DESCRIPTION OF THE PREFERABLE EMBODIMENTS

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

The frequency tuning and DC offset canceling circuit for continuous-time analog filter with time division according to certain embodiments of the invention will be described below in more detail with reference to the accompanying drawings. Those components that are the same or are in correspondence are rendered the same reference numeral regardless of the figure number, and redundant explanations are omitted.

FIG. 3 is a circuit diagram showing a frequency tuning and DC offset canceling circuit for continuous-time analog filter with time division in accordance with an embodiment of the present invention. FIG. 4 is waveforms of a control signal and output signals when frequency tuning is performed in the frequency tuning and DC offset canceling circuit for continuous-time analog filter through an SAR (Successive Approximation Register) scheme.

As shown in FIG. 3, the frequency tuning and DC offset canceling circuit for continuous-time analog filter with time division in accordance with an embodiment of the present invention includes a frequency tuning/DC offset canceling unit, and a control signal generator.

The control signal generator generates a frequency tuning control signal and a DC offset canceling control signal based on a reference clock in time division. The frequency tuning/DC offset canceling unit tunes a frequency by comparing an output voltage with a reference voltage when a frequency tuning control signal is inputted, and cancels a DC offset after completing frequency tuning when a DC offset canceling control signal is inputted.

That is, since the frequency tuning/DC offset canceling unit is driven according to a DC offset control signal and a frequency tuning control signal inputted in time division, it performs not only a frequency tuning function, but also a DC offset canceling function during a clock signal in a predetermined period based on a reference clock signal.

The frequency tuning performed by the frequency tuning and DC offset canceling circuit for continuous-time analog filter with time-division may use a monolithic scheme, or an SAR scheme.

The monolithic scheme is based on the fact that frequency tuning is achieved by adding the capacitor array by one LSB in each period while comparing output voltages of integrators. The SAR is based on the fact that frequency tuning is achieved by dividing the capacitor array in half before integral calculation and repeatedly comparing output voltages with reference voltages.

First, when the monolithic scheme is used for frequency tuning, the control signal generator compares the reference voltage with an output voltage of an amplifier, and when the comparison result shows that an output voltage of an amplifier is higher than a reference voltage, terminates generation of a frequency tuning control signal and generates a DC offset canceling signal.

Thereafter, a description will be given of a case where the frequency tuning is used through an SAR scheme.

When the frequency tuning is used through the SAR scheme, half of all capacitor array is connected before integral calculation, and the output voltage of the amplifier is compared with the reference voltage. In this case, the output of the comparator is stored in the register.

When the output of the comparator is high, a three-fourth (¾=½−¼) of all capacitor array is connected before integral calculation. There is generated a control signal which tunes a cut-off frequency of a filter by the output of the comparator stored in the resister every time integral calculation and comparison operation are repeatedly performed by the number of preset bits.

The frequency tuning/DC offset canceling unit for an active-RC filter includes either a plurality of switching elements, fixed resistors, variable capacitors, an amplifier, and a comparator, or a plurality of switching elements, variable resistors, fixed capacitors, an amplifier, and a comparator. The frequency tuning and DC offset canceling circuit for a Gm-C filter may include a plurality of switching elements, variable capacitors, transconductance amplifiers, and comparators.

Herein, a plurality of the switching elements include first to third switching elements driven when a frequency tuning control signal is inputted, and fourth and fifth switching elements driven when a DC offset canceling control signal is inputted.

The first switching element applies an input voltage (reference voltage) to the amplifier when a frequency tuning control signal is inputted, and the second switching element allows the capacitors to be discharged, and the third switching element connects output terminals of the amplifier and the comparator.

The comparator connected to the amplifier compares an output voltage of the amplifier with the reference voltage to thereby determine a cut-off frequency.

Since the third switching element and fourth and fifth switching elements are driven in a manner to be complementary to each other, during frequency tuning, the third switching element is in an "OFF" state and the fourth and fifth switching elements are driven in an "ON" state, and during DC offset canceling, the third switching element is in an "OFF" state and the fourth and fifth switching elements are driven in an "ON" state.

Also, it is preferable that when the fourth and fifth switching elements are connected to each other in the frequency tuning and DC offset canceling circuit for continuous-time analog filter, an output voltage of the amplifier is feedback-connected to an input terminal of the amplifier.

When the fourth and fifth switching elements are in "ON," the input and output voltages of the frequency tuning and DC offset canceling circuit for continuous-time analog filter are connected to output and input voltages of a low-pass filter, respectively, so an integrator between input and output of the low-pas filter is feedback-connected, which results in generation of a high-pass pole in a DC domain.

In the case where the conventional operational amplifier is used, when the frequency tuning/DC offset canceling unit performs frequency tuning, a time constant may be determined by a product of a resistor's value connected to the amplifier and a capacitor's value, and it may be modified by controlling values of variable capacitors and variable resistors.

In the case where the transconductance amplifier is used, when the frequency tuning/DC offset canceling unit performs frequency tuning, the time constant may be determined by a ratio of a transconductance amplifier's amplification rate (gm) and a variable capacitor's value (C), and it may be modified by controlling the variable resistor's value.

As shown in FIG. 4, a description will be given of waveforms of a control signal and an output signal when the SAR scheme is used for frequency tuning in the frequency tuning and DC offset canceling circuit for continuous-time analog filter with time division in accordance with an embodiment of the present invention.

First, while the frequency tuning is performed, the fourth and fifth switching elements CNT4 and CNT5 are in an "OFF" state, and the third switching element CNT3 is operated in an "ON" state.

Also, while the third switching element CNT3 is operated in an "ON" state, the amplifier outputs a value, obtained by performing integration of signals for a predetermined period, by the first and second switching elements CNT1 and CNT2.

The value obtained by performing integration of signals for the predetermined period is controlled according to the control signal T[N_0] of the variable capacitor, and the integrated value is compared with the reference voltage by the comparator.

When the variable capacitor control signal is obtained that generates an integrated value most closely approximate to the reference voltage, the frequency tuning operation is terminated.

After the frequency tuning operation is terminated, the DC offset canceling function starts to be performed. Therefore, the first to third switching elements CNT1 to CNT3 become "OFF," and the fourth and fifth switching elements CNT4 and CNT5 are operated in an "ON" state, so that each of input and output terminals of the integrator are connected to each of output and input terminals of the continuous-time analog filter in a feedback-configuration manner.

Therefore, the frequency tuning/DC offset canceling unit configured in one integrator type is used so that the frequency tuning and DC canceling functions can be performed in time division.

In general, since an integrator occupies the largest area within an analog filter, an area defined by equation (3) below is necessary when $n^{th}$ filter is implemented by configuring a frequency tuning unit and a DC offset canceling unit to be a separate integrator. However, when the frequency tuning/DC offset canceling unit in accordance with an embodiment of the present invention is used, it is possible to implement an analog filter with an area defined by equation (4) below.

$$A_T=(N+2)*A_1 \quad (3)$$

$$A_T=(N+1)*A_1 \quad (4)$$

Wherein, $A_1$ denotes an area of the integrator, and $A_t$ denotes an overall area.

For example, when a fifth filter is used, it is possible to reduce an area as much as 14% of the overall area.

When a frequency tuning circuit is designed in an integrator type in the embodiment of the present invention, since a high-pass pole can be generated by feedback-connecting an integrator between input and output of a low-pass filter, the frequency tuning circuit can be used as a circuit for canceling a DC offset component.

Also, since a frequency tuning circuit and a DC offset canceling circuit can be simultaneously used even through one integrator, it is possible to reduce an area of an analog filter.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A frequency tuning/DC_(direct current) offset canceling circuit for a continuous-time analog filter, the frequency tuning/DC offset canceling circuit comprising:
    a frequency tuning/DC offset canceling unit for performing frequency tuning by comparing an output voltage with a reference voltage when a frequency tuning control signal is inputted, and canceling a DC offset after terminating the frequency tuning when a DC offset canceling control signal is inputted; and
    a control signal generator for generating the frequency tuning control signal and the DC offset canceling control signal based on a reference clock.

2. The frequency tuning/DC offset canceling circuit of claim 1, wherein the frequency tuning uses a monolithic scheme or a Successive Approximation Register (SAR) scheme.

3. The frequency tuning/DC offset canceling circuit of claim 1, wherein the frequency tuning/DC offset canceling unit includes a plurality of switching elements, resistors, variable capacitors, an amplifier, and a comparator.

4. The frequency tuning/DC offset canceling circuit of claim 1, wherein the frequency tuning/DC offset canceling unit includes a plurality of switching elements, variable resistors, capacitors, an amplifier, and a comparator.

5. The frequency tuning/DC offset canceling circuit of claim 3, wherein the switching elements include first to third switching elements, and fourth and fifth switching elements, wherein the first to third switching elements are driven when the frequency tuning control signal is inputted, and the fourth and fifth switching elements are driven when the DC offset canceling control signal is inputted.

6. The frequency tuning/DC offset canceling circuit of claim 5, wherein, when the frequency tuning control signal is inputted, the first switching element applies the reference voltage to the amplifier, the second switching element allows the variable capacitors to be discharged, and the third switching element connects an output terminal of the amplifier to the comparator.

7. The frequency tuning/DC offset canceling circuit of claim 5, wherein the third switching element and the fourth and fifth switching elements are driven to be complementary to one another.

8. The frequency tuning/DC offset canceling circuit of claim 5, wherein, when the fourth and fifth switching elements are connected to each other, input and output terminals of the amplifier are connected to output and input terminals of the continuous-time analog filter in such a manner to be feedback-configured.

9. The frequency tuning/DC offset canceling circuit of claim 3, wherein, during the frequency tuning, a time constant is determined by a product of values of the resistor and the variable capacitor.

10. The frequency tuning/DC offset canceling circuit of claim 3, wherein, when the frequency tuning is performed in a monolithic scheme, the control signal generator compares the output voltage of the amplifier with the reference voltage, and when the comparison result shows the output voltage is within a range set based on the reference voltage, the control signal generator terminates a generation of the frequency tuning control signal and generates the DC offset canceling control signal.

11. The frequency tuning/DC offset canceling circuit of claim 3, wherein, when the frequency tuning is performed in a Successive Approximation Register scheme, the control signal generator
    connects half of the variable capacitors,
    repeatedly performs an operation of storing a result, the result being obtained by comparing the output voltage of the amplifier with the reference voltage, in an output register as many as corresponding bits, and
    then terminates the generation of the frequency tuning control signal and generates the DC offset canceling control signal.

12. The frequency tuning/DC offset canceling circuit of claim 1, wherein the frequency tuning/DC offset canceling unit includes a plurality of switching elements, variable capacitors, a transconductance amplifier, and a comparator.

13. The frequency tuning/DC offset canceling circuit of claim 12, wherein, during the frequency tuning, the time constant is determined by a ratio of an amplification rate of the transconductance amplifier and the variable capacitor's value.

14. The frequency tuning/DC offset canceling circuit of claim 4, wherein, during the frequency tuning, a time constant is determined by a product of values of the variable resistor and the capacitor.

* * * * *